US010222602B2

(12) United States Patent
Steinborn et al.

(10) Patent No.: US 10,222,602 B2
(45) Date of Patent: Mar. 5, 2019

(54) OPTICS DEVICE WITH AN OPTICS MODULE THAT COMPRISES AT LEAST ONE OPTICAL ELEMENT

(71) Applicant: Carl Zeiss Microscopy GmbH, Jena (DE)

(72) Inventors: Stefan Steinborn, Bovenden (DE); Steffen Leidenbach, Gleichen (DE); Christoph Windolph, Goettingen (DE)

(73) Assignee: Carl Zeiss Microscopy GmbH, Jena (DE)

(*) Notice: Subject to any disclaimer, the term of this patent is extended or adjusted under 35 U.S.C. 154(b) by 232 days.

(21) Appl. No.: 15/190,937

(22) Filed: Jun. 23, 2016

(65) Prior Publication Data

US 2017/0003489 A1 Jan. 5, 2017

(30) Foreign Application Priority Data

Jul. 3, 2015 (DE) ........................ 10 2015 110 795

(51) Int. Cl.
*G02B 21/24* (2006.01)

(52) U.S. Cl.
CPC ......... *G02B 21/245* (2013.01); *G02B 21/241* (2013.01)

(58) Field of Classification Search
CPC ............................ G02B 21/245; G02B 21/241
See application file for complete search history.

(56) References Cited

U.S. PATENT DOCUMENTS

| | | | | |
|---|---|---|---|---|
| 6,259,473 | B1 * | 7/2001 | Iko | G01N 23/04 348/80 |
| 6,323,995 | B1 | 11/2001 | Takahama et al. | |
| 6,809,860 | B2 | 10/2004 | Stenzel | |
| 6,941,247 | B2 | 9/2005 | Voigt et al. | |
| 7,613,528 | B2 | 11/2009 | Shirota | |
| 8,053,711 | B2 | 11/2011 | Fomitchov et al. | |
| 8,120,649 | B2 | 2/2012 | Hashimoto et al. | |
| 2004/0113043 | A1 | 6/2004 | Ishikawa et al. | |
| 2004/0125438 | A1 | 7/2004 | Studer et al. | |
| 2006/0103923 | A1 | 5/2006 | Dietrich et al. | |
| 2009/0180175 | A1 | 7/2009 | Tumpner | |
| 2011/0082590 | A1 | 4/2011 | Fahlbusch et al. | |

FOREIGN PATENT DOCUMENTS

| | | | |
|---|---|---|---|
| DE | 19839777 | A1 | 3/1999 |
| DE | 10249177 | A1 | 5/2004 |
| DE | 10349419 | A1 | 7/2005 |
| JP | 2003043374 | A2 | 2/2003 |

* cited by examiner

*Primary Examiner* — Tony Ko
(74) *Attorney, Agent, or Firm* — Skaar Ulbrich Macari, P.A.

(57) ABSTRACT

An optics device with an optics module that includes at least one optical element and a control module for controlling the optics device is provided. The optics module includes a sub-system with a memory as well as at least one of an actuator and a sensor. An instruction for setting the actuator and/or the sensor of the sub-system is stored in the memory. The control module is formed such that, during operation of the optics device, it reads the instructions from the memory of the sub-system and activates the actuator and/or the sensor of the sub-system according to the instruction.

15 Claims, 3 Drawing Sheets

OPTICS DEVICE WITH AN OPTICS MODULE THAT COMPRISES AT LEAST ONE OPTICAL ELEMENT

PRIORITY

This application claims the benefit of German Patent Application No. 102015110795.3, filed on Jul. 3, 2015, which is hereby incorporated herein by reference in its entirety.

FIELD

The present invention relates to an optics device with an optics module that comprises at least one optical element, such as e.g. a microscope.

BACKGROUND

In developing optics devices, there is always the challenge that there are sub-systems which are intended to perform complex processes in the complete system but about which the complete system for a start does not exactly know how the processes are to be executed in the sub-system.

The complete system can be equipped, during development, with complete knowledge of the capabilities and the use of the sub-system. A disadvantage of this is that, with every change in the properties of the sub-system made during development, the complete system must also be revised in order to be able to apply the new properties.

Furthermore, it is possible to equip the sub-system completely with computing capability, with the result that it can perform its processes in the complete system itself. The complete system would then have to initiate the execution of the sub-system processes via suitable commands at the appropriate moment. A disadvantage of this is that the development of the sub-system becomes significantly more complex. A corresponding computing capability needs to be incorporated, a command structure needs to be developed in order to be able to communicate with the outside world, and both the sub-system and also the complete system and the associated commands need to be revised if new or amended functionalities of the sub-system are to be developed.

SUMMARY

An object of the invention is to provide an optics device with an optics module that comprises at least one optical element and a sub-module in such a way that the difficulties described in the Background section herein are resolved as completely as possible.

The disclosure includes an optics device with an optics module that comprises at least one optical element and a sub-system, and a control module for controlling the optics device, wherein the sub-system comprises a memory as well as an actuator and/or a sensor, wherein an instruction (or a provision) for setting the actuator and/or the sub-system is stored in the memory, wherein the control module is formed in such a way that, during operation of the optics device, it reads the instruction from the memory of the sub-system and activates the actuator and/or the sensor of the sub-system according to the instructions.

The sub-system can thus be developed very easily. It can be designed concentrating on the use of the actuator and/or of the sensor. It is not necessary to use an extended computing capability, which would lead to higher costs and greater complexity. An additional command structure is also not required. However, the optics device as complete system is nevertheless capable of using the sub-system effectively in complex scenarios.

The sub-system can be formed in such a way that it provides two basic functions. On the one hand, it offers (very fundamental) control of its actuator and/or of its sensor. The control or activation of the actuator can be the movement by means of a motor and the setting of a position. On the other hand, the sub-system offers a storage capability.

An instruction (or provision) of the optics device can include a mathematical provision (or a mathematical formula) and the control module can comprise an arithmetic unit which, during operation of the optics device, calculates a result of the mathematical provision and takes it into account during the activation (or control) of the actuator and/or of the sensor of the sub-system.

At least one first parameter which describes a property of the sub-system and is taken into account in the instruction can be stored in the memory, and the control module can be formed in such a way that, during operation of the optics device, it reads the first parameter or the first parameters and takes it/them into account during the activation (or control) of the actuator and/or sensor of the sub-system according to the instructions.

At least one second parameter, which describes a property of the optics device or a property to be taken into account during the operation of the optics device but not a property of the sub-system and is taken into account in the instruction, can be supplied to the control module, and the control module can be formed in such a way that, during operation of the optics device, it takes into account the second parameter or the second parameters in activating (or in controlling) the actuator and/or the sensor of the sub-system according to the instruction.

Furthermore, the instruction can be stored in textual form in the memory of the sub-system. In particular, they can be stored as an XML file.

The textual form can be read and interpreted by the control module. The sub-system itself does not need to be capable of also carrying out this interpretation. It can thus be said that the sub-system does not need to know about its own role in the complete system.

In particular, the sub-system can be provided in the optics device in such a way that it can be exchanged.

Furthermore, the sub-system can be formed in such a way that it cannot itself carry out the instruction(s) stored in its memory.

The optics device according to the invention can, for example, be formed as a measuring device, capturing device and/or as a processing device. In particular, the optics device according to the invention can be formed as a microscope. The sub-system can be an objective of the microscope. The first parameter can be, e.g., a calibration parameter of the objective. The second parameter can be, e.g., the thickness of a cover glass which carries a sample to be examined, or the thickness of a base of a vessel in which the sample is located.

It is understood that the features mentioned above and those yet to be explained below can be used not only in the stated combinations but also in other combinations or alone, without departing from the scope of the present invention.

Figure 1:
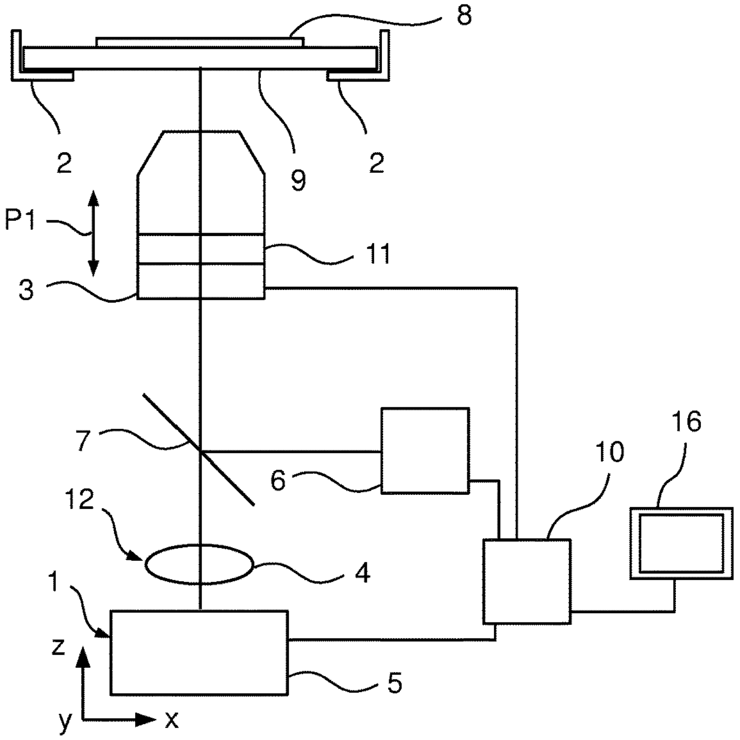
FIG. 1 is a schematic view of an embodiment of the optics device according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

In the embodiment shown in FIG. 1, the optics device according to the invention is formed as a microscope which comprises a holder 2, an objective 3, a first partial lens system 4 as well as a camera 5. In addition, the microscope 1 comprises a first light source 6, the illumination light of which is coupled into the imaging beam path via a partially transparent mirror 7 arranged between the objective 3 and the first partial lens system 4 and can thus be directed via the objective 3 onto a sample 8 which is mounted in the holder 2. The sample 8 can, for example, be arranged on a sample holder or cover glass 9 which is mounted in the holder 2. An immersion medium (such as e.g. water, oil or glycerol) (not shown) can be provided between the objective 3 and the cover glass. Alternatively, the immersion medium can also be dispensed with. In this case there is, for example, air between the objective 3 and the cover glass 9.

In addition, the microscope 1 comprises a control module 10 which serves to control the microscope 1 during the operation of the microscope. The objective 3 comprises a schematically drawn-in correction ring 11 which is motor-driven and can be adjusted and set by means of the control module 10.

The sample 8 illuminated with the light of the light source 6 is imaged, magnified, on the camera 5 in a known manner via the objective 3 and the first partial lens system. In order to produce a sharp image, the objective 3 can be moved, for example, along the z direction, as is indicated by the double arrow P1 in FIG. 1. By this means, the focal position of the object 3 or the corresponding image on the camera 5 can be shifted in the z direction such that it coincides with the sample 8 to be imaged.

The objective 3 forms, together with the first partial lens system 4, an optics module 12 of the microscope 1, which module comprises the objective 3 as sub-system. In the embodiment described here, in addition to the motor-driven correction collar 11, the objective 3 comprises, as is indicated in the schematic representation in FIG. 2, a control unit 13, which sets the position of the correction collar 11 contained in a command in reaction to the command, an imaging optical system 14 which is represented schematically as a lens, and a memory 15 in which an internal parameter is stored. The internal parameter can be, but does not have to be, stored in the memory 15. It can also be stored elsewhere in the objective 3. The internal parameter can be, e.g., a calibration value Cal0 which was individually calibrated during the manufacture of the objective 3 and then stored in the objective 3.

Instructions (e.g. a mathematical formula) are stored in the memory 15 which indicate the position of the correction collar CR0 in dependence on the calibration value Cal0, a thickness of the cover glass 9 to be entered (variable name CBT) as well as a depth of field (variable name ID). The corresponding formula 1 can read as follows for example:

$$CR0=Cal0+136.892\times(CBT-170)+140.562\times\mathrm{ID} \quad (1)$$

Figure 2:
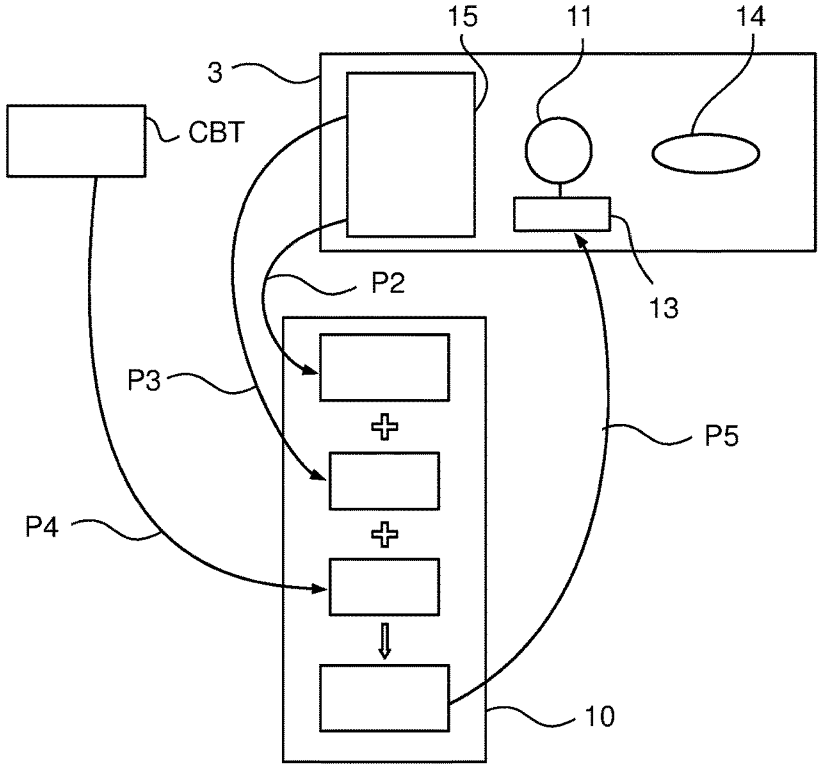
FIG. 2 is a schematic functional representation to explain the operation of the optics device according to the invention of FIG. 1.

This concept is clarified in FIG. 2.

The control module 10 reads the formula stored in the memory 15 (arrow P2) as well as the internal parameter CR0 (arrow P2) from the objective 3 (here from the memory 15) and then calculates from this and from the externally entered cover glass thickness CBT (arrow P4) the position CR0 of the correction collar 11 and activates the latter correspondingly (arrow P5) with the result that it is brought into the calculated position and brings about the desired correction.

Thus, the description for adjusting the correction collar of the objective 3 is stored in the objective 3 itself (and not in the control module 10). Since the objective 3 does not comprise its own arithmetic unit for evaluating the mathematical formula, it cannot evaluate it itself. The control module 10, which reads and evaluates the mathematical formula in the described manner during the operation of the microscope 1, is provided for this. Because the objective 3 only provides the basic activation of the correction collar 11 and provides the storage capability by means of the memory 15, it can be developed very easily. It is thus not necessary to use an extended computing capability in the objective 3 which would lead to higher costs and greater complexity. In particular, no additional command structure is required, which would be necessary if the formula were to be evaluated in the objective 3 itself. In this case, this would have to be initiated by the control module 10 at the correct moment during the operation of the microscope.

The control module 10 only needs to be designed in such a way that it can evaluate the formula stored in the memory. For example, the formula can be stored in the objective 3 in a textual format (such as e.g. XML). Then, the control module 10 is designed in such a way that it can read and interpret the formula as well as the corresponding parameters and calculate therefrom the corresponding setting value for the correction collar 11. For this, the control module 10 can compile the formula present as text into machine code by means of a parser and execute it. The result of the calculation is used directly by the control module 10 as a position value to which the correction collar 11 needs to be adjusted. The objective 3 can comprise firmware for activating the correction collar 11 ("go to position x") by means of the control unit 13. In response to an enquiry from the control module 10, the firmware provides an XML text with the mathematical instructions for adjusting the correction collar in dependence on the external and internal parameters. The XML text can read as follows for example <?xml version='1.0' encoding-,Windows-1252'?>
<obj>
<mode id='Thin glass 23‹C'>

```
<var id='Cover glass thickness' symbol='CBT' unit='&#x00B5;m' min='130' max='210' default='170'/>
<var id='Depth of field' symbol='ID' unit='&#00B5;m' min='0' max='50' default='0'/>
<calc symbol='CR0'>Cal0+136.892*(CBT−170)+140.562*ID</calc>
<calc symbol='WD'>1698.51−0.20061*(CBT−170)−0.29045*ID</calc>
</mode>
</obj>
```

This XML text indicates that the objective 3 can be controlled in a mode "Thin glass 23° C.". Here there is the external parameter "Cover glass thickness" (variable name CBT) with possible values in the range of from 130-210 μm and "Depth of field" (variable name ID) with possible values in the range of from 0 μm to 50 μm. An external parameter is a parameter the value of which is not stored in the objective 3. The value of the external parameter must therefore come from outside the objective 3.

The adjustment of the correction collar CR0 is calculated using Formula 1 stated above. With the further Formula 2, the change of the working distance WD through the adjustment can also be calculated as follows.

$$WD=1698.51-0.20061\times(CBT-170)-0.290045\times \mathrm{ID} \qquad (2)$$

Figure 3:
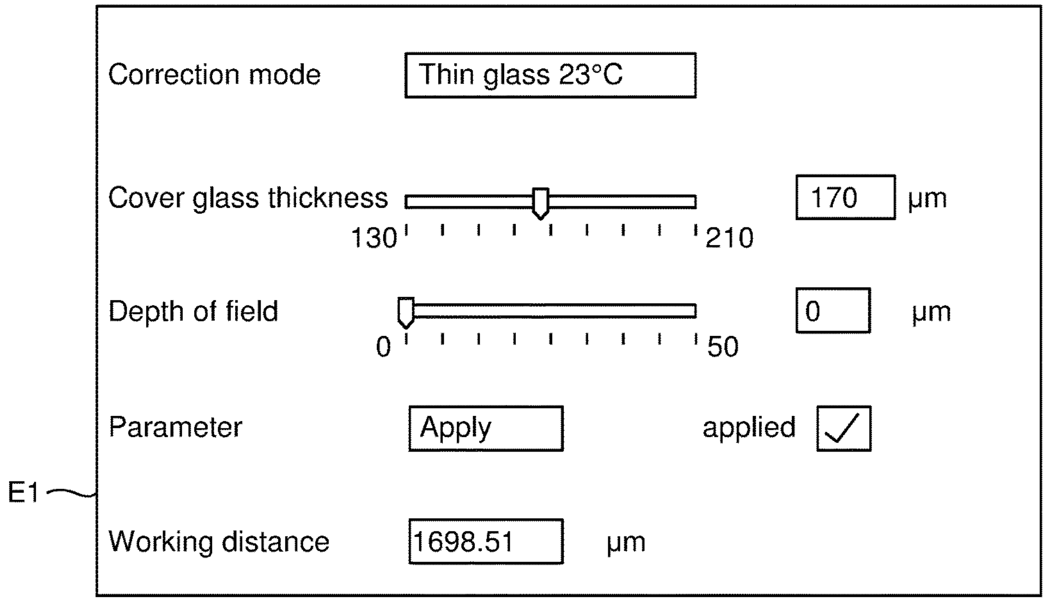
FIG. 3 is a user interface generated by the control module of the optics equipment.

The control module 10 or the software running on it reads this XML text and the calibration value Cal0 from the objective firmware, interprets them and is thus in a position to display via a monitor 16 (FIG. 1) e.g. the user interface E1 shown in FIG. 3 for activating the objective 3.

Here, the values of the external parameters "Cover glass thickness" and "Depth of field" can be set with the schematically represented slide controls. The value set is, in each case, shown in the box arranged next to it on the right. If the "apply" button next to the text "Parameter" is selected, the values set for cover glass thickness and depth of field are used in Formula 1 and the correction collar 11 is set to the determined value by a command to the objective firmware. In addition, the values set are applied in Formula 2 and the result is indicated in the box next to the text "Working distance". After selection of the "apply" button, this is represented by a tick in the box next to the text "applied".

Figure 4:
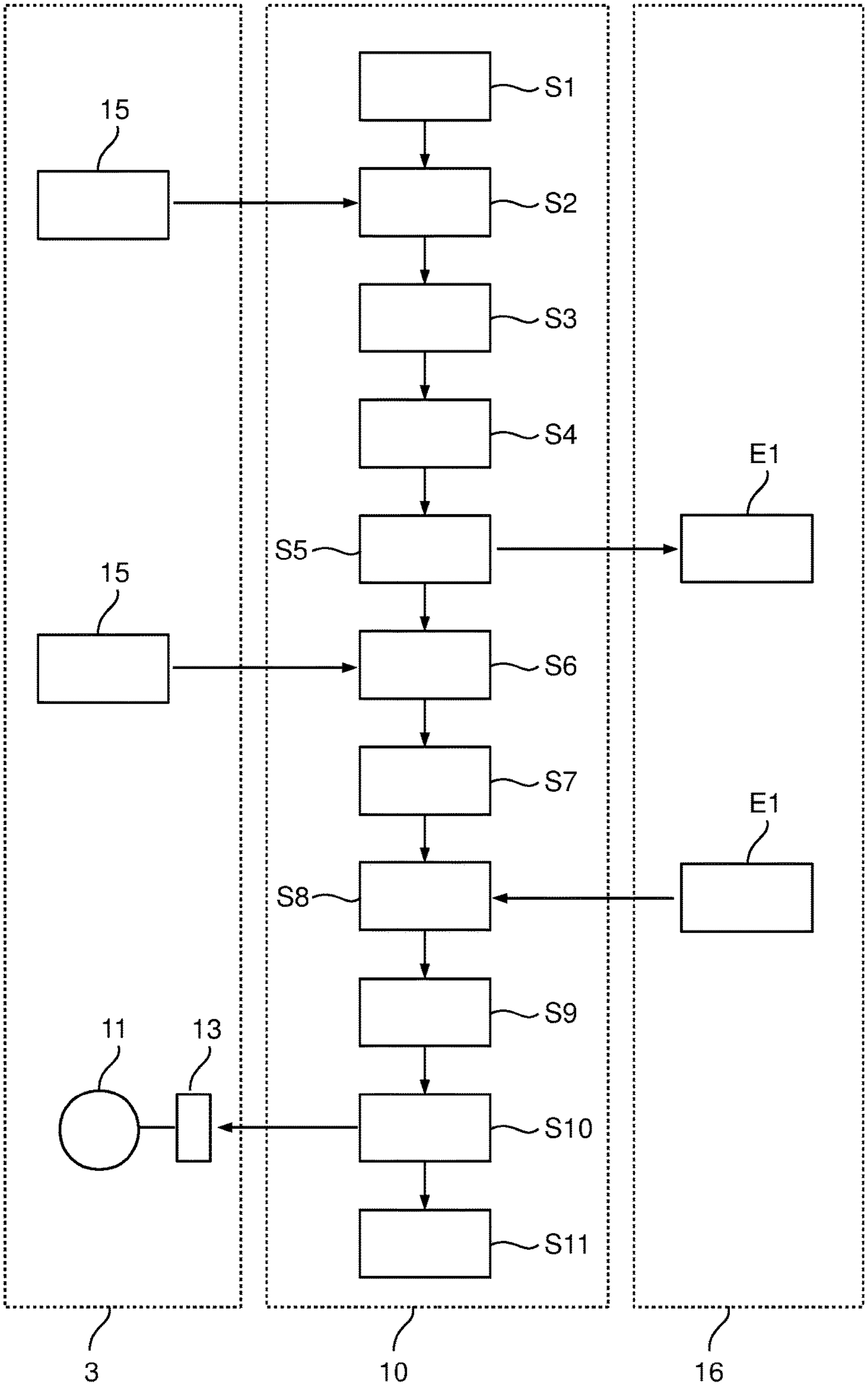
FIG. 4 is a flow diagram to explain the operation of the optics device.

The process is to be described again in detail in conjunction with the flow diagram of FIG. 4.

In step S1, the corresponding program is launched in the control module 10. In step S2, the XML file is read from the objective 3. In step S3, it is checked whether an XML text for CR0 is contained or not. If this is not the case, the program ends, otherwise it continues with step S4. In step S4, the name and value ranges of the variables are read from the XML text for CR0. In step S5, the input interface is generated and displayed (E1). In step S6, the calibration value Cal0 is read from the memory 15. In step S7, the formula for CR0 is parsed. In step S8, the values for the cover glass thickness and depth of field set via the user interface E1 are retrieved and the position for the correction collar 11 is calculated with them in step S9. In step S10, the motor of the correction collar 11 of the object 3 is set to the calculated value and the process ends with step S11.

In the embodiment described here, the objective 3 is provided in the microscope 1 in such a way that it can be exchanged. Thus, a further objective 3 can be used which comprises the same firmware as the objective 3 already described. However, it differs in terms of the mathematical instructions and the calibration values specific to the example. In the case of this objective, only the cover glass thickness has an influence on the correction collar adjustment. For this, however, two correction collars (CR0 and CR1) are to be set. The corresponding XML text is indicated below.

```
<?xml version= '1.0' encoding='Windows-1252'?>
<obj>
    <mode id='Thin glass 238&#x00B0;C'>"
        <var id='Cover glass thickness' symbol='CBT' unit='&#00B5;m' min='130' max='210'
default='170' />
        <calc symbol='CR0'>Cal0 − 905455796e−12*CBT^4 + 662348212e−9*CBT^3 − 178102295e−
6*CBT^2 + 21129542e−3*CBT − 942737</calc>
        <cal symbol='CR1'>Cal1 + 24028955e−15*CBT^5 + 260876589e−12*CBT^4 − 229321295e−
9*CBT^3 + 68903597e−6*CBT^2 − 9138458e−3*CBT + 467581</calc>
      <calc symbol='WD'>12236850.26 + 11766.11462*CBT + 83.300329511*CBT^1.5 +
0.19835205355*CBT^2.5 − 12229113.1*Exp(CBT/1000)</calc>
    </mode>
</obj>
```

Figure 5:
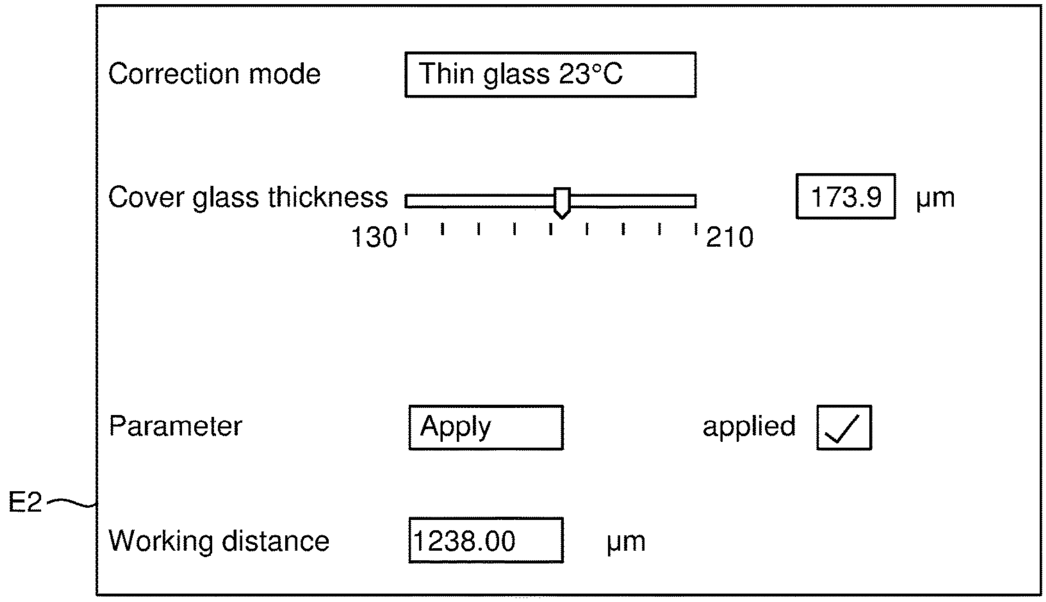
FIG. 5 is a representation of a further user interface which can be generated by the control module.

On the basis of this XML text, the control module 10 can display the user interface E2 shown in FIG. 5. For this, no changes are necessary at all in the control module 10. This is effected with software which is identical to that which also generated the user interface according to FIG. 3.

By selecting the "apply" button next to the text "Parameter", the set value for the cover glass thickness is used in the corresponding formulae. The corresponding values are given to the objective firmware so that this sets the correction collars CR0 and CR1 to these values.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An optics device, comprising:

an optics module including at least one optical element; and a control module for controlling the optics device, the optics module comprising:

a sub-system including a memory; and at least one of an actuator and a sensor, wherein an instruction for setting the at least one of the actuator and the sensor of the sub-system is stored in the memory, and wherein the control module is formed such that during operation of the optics device, the control module reads the instruction from the memory of the sub-system and activates the at least one of the actuator and the sensor of the sub-system according to the instruction, and wherein the sub-system is configured in the optics device such that the sub-system can be exchanged.

2. The optics device according to claim 1, wherein the instruction is a mathematical instruction and the control module comprises an arithmetic unit which, during operation of the optics device, calculates a result of the mathematical instruction and takes it into account during the activation of the at least one of the actuator and the sensor of the sub-system.

3. The optics device according to claim 2, wherein a second parameter which describes a property of the optics device or a property to be taken into account during the operation of the optics device, but not a property of the sub-system, and is taken into account in the instruction, is supplied to the control module and the control module is formed such that during operation of the optics device, the control module takes into account the second parameter in activating the at least one of the actuator and the sensor of the sub-system according to the instruction.

4. The optics device according to claim 2, wherein a first parameter which describes a property of the sub-system and is taken into account in the instruction is stored in the memory, and the control module is formed such that, during operation of the optics device, the control module reads the first parameter and takes the first parameter into account during the activation of the at least one of the actuator and the sensor of the sub-system according to the instruction.

5. The optics device according to claim 4, wherein a second parameter which describes a property of the optics device or a property to be taken into account during the operation of the optics device, but not a property of the sub-system, and is taken into account in the instruction, is supplied to the control module and the control module is formed such that during operation of the optics device, the control module takes into account the second parameter in activating the at least one of the actuator and the sensor of the sub-system according to the instruction.

6. The optics device according to claim 1, wherein a first parameter which describes a property of the sub-system and is taken into account in the instruction is stored in the memory, and the control module is formed such that during operation of the optics device, the control module reads the first parameter and takes the first parameter into account during the activation of the at least one of the actuator and the sensor of the sub-system according to the instruction.

7. The optics device according to claim 6, wherein a second parameter which describes a property of the optics device or a property to be taken into account during the operation of the optics device, but not a property of the sub-system, and is taken into account in the instruction, is supplied to the control module and the control module is formed such that during operation of the optics device, the control module takes into account the second parameter in activating the at least one of the actuator and the sensor of the sub-system according to the instruction.

8. The optics device according to claim 6, wherein the instruction is stored in a textual form in the memory of the sub-system.

9. The optics device according to claim 6, wherein the sub-system is configured such that the sub-system cannot itself carry out the instructions stored in the memory of the sub-system.

10. The optics device according to claim 1, wherein a second parameter which describes a property of the optics device or a property to be taken into account during the operation of the optics device, but not a property of the sub-system, and is taken into account in the instruction, is supplied to the control module and the control module is formed such that during operation of the optics device, the control module takes into account the second parameter in activating the at least one of the actuator and the sensor of the sub-system according to the instruction.

11. The optics device according to claim 10, wherein the instruction is stored in a textual form in the memory of the sub-system.

12. The optics device according to claim 10, wherein the sub-system is configured such that the sub-system cannot itself carry out the instructions stored in the memory of the sub-system.

13. The optics device according to claim 1, wherein the instruction is stored in a textual form in the memory of the sub-system.

14. The optics device according to claim 1, wherein the sub-system is configured such that the sub-system cannot itself carry out the instructions stored in the memory of the sub-system.

15. The optics device according to claim 1, wherein the optics device is a microscope.

* * * * *